March 3, 1970  D. P. GERBASI ET AL  3,498,148
CHAIN DRIVE
Filed Oct. 7, 1968
FIG. 1
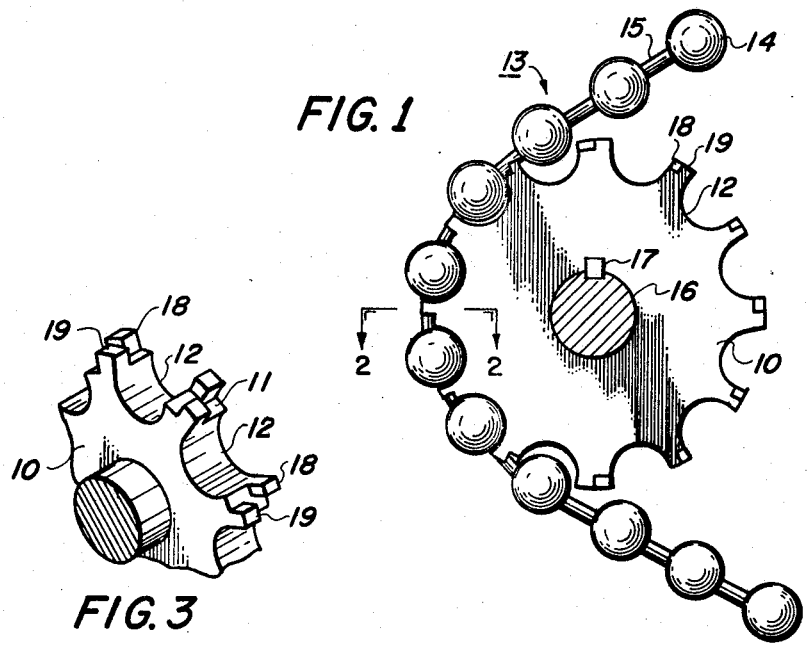
FIG. 3
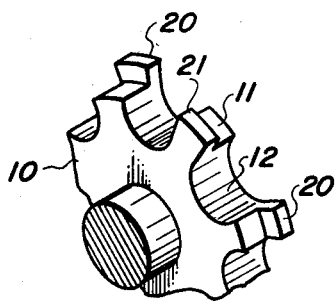
FIG. 4
FIG. 2
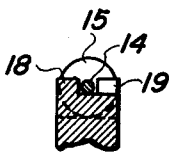
INVENTORS
DENNIS P. GERBASI
RICHARD C. PALERMO
BY
ATTORNEY United States Patent Office 3,498,148
Patented Mar. 3, 1970

3,498,148
CHAIN DRIVE
Dennis P. Gerbasi, Webster, and Richard C. Palermo, West Webster, N.Y., assignors to Xerox Corporation, Rochester, N.Y., a corporation of New York
Filed Oct. 7, 1968, Ser. No. 765,536
Int. Cl. F16h 55/08, 55/30
U.S. Cl. 74—229                                    7 Claims

ABSTRACT OF THE DISCLOSURE

A bead chain and sprocket drive system having a castable sprocket capable of guiding the bead chain along a pre-determined path of travel.

---

This invention relates, in general, to a power transmitting apparatus and, in particular, to a bead chain and sprocket drive system.

More specifically, this invention relates to a chain and sprocket drive capable of tracking or guiding a bead chain along a pre-determined path of travel. In order that the drive be self tracking the sprocket must be able to engage the chain links in such a manner as to prevent the chain from moving laterally or "walking" across the rim of the sprocket. Heretofore, self tracking sprockets were generally characterized by their complexity. Because of their complexity, these sprockets did not lend themselves to conventional casting or molding technique and were therefore relatively expensive to fabricate.

It is then a primary object of this invention to improve bead chain transmissions by providing a driving and guiding member which is simple and inexpensive to fabricate.

This and other objects of the present invention are obtained by an improved sprocket having grooves and alternatively raised embossed sections positioned about the outer rim portion thereof which cooperates to guide a ball chain member passing thereover along a pre-determined path of travel.

For a better understanding of the invention as well as other objects and further features thereof, reference is had to the following detailed of the invention to be read in conjunction with the accompanying drawings, wherein:

FIG. 1 is a front elevation of the drive sprocket and ball chain transmission of the present invention;

FIG. 2 is a side elevation of the sprocket and ball chain shown in FIG. 1 taken along line 2—2;

FIG. 3 is a partial perspective view of the sprocket shown in FIG. 1 and

FIG. 4 is a partial perspective view of another embodiment of a sprocket having the features of the present invention.

The present invention, basically, relates to an improved drive sprocket for bead chain transmissions and the like in which the bead receiving sprocket is arranged so that the bead engaging and guiding elements can be easily formed by a casting operation, as for example, by means of casting in a simple two part split mold. In accordance with the present invention, sprocket 9 may be made of almost any desired material and of any suitable size capable of cooperating with a bead chain. As illustrated in FIGS. 1, 2 and 3, a typical sprocket includes a body member 10 terminating in a rim portion 11. An aperture, 16, and a keyway, 17, are provided in the body of the sprocket by which the sprocket can be securely mounted to a shaft member 23, or the like. Along the outer periphery of the sprocket are a series of recesses or grooves 12 formed therein and being adapted to receive, in operative relation, a conventional bead chain. The bead chain, generally referred to as 13, comprises beads 14 connected by flexible links 15.

In accordance with the instant invention, the grooves in the body portion of the sprocket extend transversely across the entire rim or outer periphery of the sprocket and are concavely curved to receive therein the balls member on bead chain 13. When a ball is seated in the groove, as shown in FIGS. 1 and 2, the flexible link portion of the chain is supported at an elevation sufficient to clear the rim surface 11. Although the grooves in this preferred embodiment are shown semi-spherical in shape, it should be clear that grooves of any shape can be utilized to seat the balls in the body sprocket. For example, when the size of the chain beads is extremely small, a V-shaped groove may be better adapted to receive and drive the chain. The spacing of the grooves should be pre-determined to coincide with the pitch of the bead chain. That is, corresponding surfaces on each of the successive parallel grooves should be spaced at a distance substantially equal to pitch distance between beads on chain 13.

As shown in FIG. 3, two raised embossed sections 18, 19 are positioned between each successive groove on the sprocket rim surface. The individual sections are raised alternately from opposite sides of the rim surface and extend transversely across less than one half of the rim. Lateral clearance is thus provided between each alternate embossment in which the flexible link of the chain is free to ride. In effect, the embossed sections restrict the lateral movement of the link thereby preventing the chain from walking on the outer surface of the sprocket as the chain moves over the rim surface.

By offsetting the raised embossed sections as shown herein, the sprocket can be easily molded in a breakable two-part conventional mold. The sprocket is cast between two mold sections having complementary cavities conforming to each half of the sprocket, one section being adapted to mold the side of the sprocket having embossed sections 19 thereon while the other section being adapted to mold the section of the sprocket upon which embossed sections 18 are raised. The transverse extension of the embossed sections is limited in the molding process so that a lateral clearance is provided between embossed sections along the center of the rim of the sprocket. As shown in FIG. 2, flexible link 15 rides in the clearance space provided thus preventing the chain from "walking" off the rim surface.

FIG. 4 is another configuration of a sprocket embodying the novel features of the present invention. In this embodiment, the embossed sections 20, 21 are alternately raised between each parallel groove on the sprocket rim. Here again, the embossments are offset laterally to receive chain links therebetween, thereby giving the sprocket the ability to guide or track the bead chain passing thereover.

What is claimed is:
1. A sprocket for receiving in operative relation therein a chain formed of a plurality of spherical beads joined by links including
   a body member having substantially a circular peripheral outer surface,
   said surface having grooves therein extending across said surface in substantially parallel relation and being adapted to receive in operative relation therein said beads,
   said surface having embossed sections thereon raised alternately from opposite sides of said surface, said raised embossed sections extending transversely across less than one-half of said surface so that the link portion of said chain is guided over the center of said outer surface.

2. The sprocket of claim 1 wherein said grooves have concavely curved bottom surfaces being arranged to receive in contiguous relation therein a portion of said bead.

3. The sprocket of claim 2 wherein said embossed sections are alternately raised between each groove.

4. The sprocket of claim 2 wherein a pair of embossed sections are alternately raised between each groove.

5. A drive mechanism including
a chain having spherical beads connected by a flexible link, each bead being positioned at a pre-determined pitch along said chain,
at least one sprocket having parallel grooves extending transverse to the outer rim surface thereof, said grooves being symmetrically spaced from each other at said pre-determined pitch and being adapted to receive in operative relation therein the bead portion of said chain,
said outer rim surface having embossed sections thereon raised alternately from opposite sides of said outer rim, said embossed sections extending transverse by less than one-half the distance across said rim whereby the flexible links of said chain are guided by said embossed sections as the sprocket drives said chain.

6. The apparatus of claim 5 wherein said embossed sections are alternately raised between each groove on the rim surface.

7. The apparatus of claim 5 wherein a part of embossed sections are alternately raised between each groove on the rim surface.

References Cited

UNITED STATES PATENTS

| | | | |
|---|---|---|---|
| 388,317 | 8/1888 | Smith | 74—243 |
| 2,791,911 | 5/1957 | Wasko | 74—243 |
| 2,856,752 | 10/1958 | Bahr | 74—243 XR |

FRED C. MATTERN, Primary Examiner

J. A. WONG, Assistant Examiner

U.S. Cl. X.R.

74—243